(12) United States Patent
Rasmussen et al.

(10) Patent No.: US 9,936,314 B2
(45) Date of Patent: Apr. 3, 2018

(54) INSERT MEMBER FOR A HEARING DEVICE

(71) Applicant: Oticon A/S, Smørum (DK)

(72) Inventors: Karsten Bo Rasmussen, Smørum (DK); Bent Severin, Smørum (DK)

(73) Assignee: OTICON A/S, Smørum (DK)

( * ) Notice: Subject to any disclaimer, the term of this patent is extended or adjusted under 35 U.S.C. 154(b) by 0 days.

(21) Appl. No.: 15/196,684

(22) Filed: Jun. 29, 2016

(65) Prior Publication Data
US 2017/0006390 A1    Jan. 5, 2017

(30) Foreign Application Priority Data

Jun. 30, 2015  (EP) .................................. 15174447

(51) Int. Cl.
*H04R 25/00* (2006.01)
*B29C 35/08* (2006.01)

(52) U.S. Cl.
CPC ......... *H04R 25/652* (2013.01); *H04R 25/658* (2013.01); *B29C 35/0805* (2013.01); *B29C 2035/0827* (2013.01); *H04R 2460/17* (2013.01)

(58) Field of Classification Search
CPC .... H04R 25/02; H04R 25/608; H04R 25/652; H04R 25/658; H04R 2225/77; H04R 2460/17; B29C 35/0805; B29C 2035/0827
See application file for complete search history.

(56) References Cited

U.S. PATENT DOCUMENTS

| | | | |
|---|---|---|---|
| 3,513,269 A * | 5/1970 | Wilson ................. | H04R 25/656 264/222 |
| 4,962,537 A | 10/1990 | Basel et al. | |
| 5,006,055 A | 4/1991 | Lebisch et al. | |
| 5,321,757 A | 6/1994 | Woodfill, Jr. | |
| 6,339,648 B1 | 1/2002 | McIntosh et al. | |
| 9,185,481 B2 * | 11/2015 | Goldstein ............ | H04R 1/1016 |
| 2005/0196005 A1* | 9/2005 | Shennib ................. | H04R 25/60 381/328 |
| 2006/0188119 A1* | 8/2006 | Parker .................. | H04R 25/608 381/322 |

(Continued)

FOREIGN PATENT DOCUMENTS

| | | |
|---|---|---|
| CA | 2 305 241 A1 | 2/2000 |
| GB | 2 203 379 A | 10/1988 |

*Primary Examiner* — Joshua Kaufman
(74) *Attorney, Agent, or Firm* — Birch, Stewart, Kolasch & Birch, LLP

(57) ABSTRACT

An insert for a hearing device is disclosed. The insert member is a flexible sealing part configured to be inserted into the ear canal of a hearing device user. The insert member comprises at least one through-going hole permeable for sound generated by the hearing device, the sound being transmitted through the insert member to an eardrum of the hearing device user or the at least one through-going hole being configured to allow an acoustically active part of the hearing device to be releasably fastened thereto. The insert member comprises a bag structure containing a non-hardened shapeable material and wherein an opening for receiving a hardening member is provided in the bag structure. The non-hardened shapeable material is configured to be hardened by means of a temperature increment and/or electromagnetic radiation, such as UV radiation or a chemical reaction.

20 Claims, 6 Drawing Sheets

(56) References Cited

U.S. PATENT DOCUMENTS

2012/0068379 A1* 3/2012 Klemenz .............. H04R 25/652
264/313
2017/0195808 A1* 7/2017 Higgins ............... H04R 25/652
2017/0311069 A1* 10/2017 Prevoir ................ H04R 1/1016

* cited by examiner

INSERT MEMBER FOR A HEARING DEVICE

FIELD

The present disclosure relates to the field of hearing devices. More particularly, the present disclosure relates to an insert member for sealing the bony part of an ear canal.

BACKGROUND

Hearing devices that can be placed completely or almost completely in the ear canal are very popular, because they are suitable for most types of hearing losses and are relatively discreet. Some of these In-The-Ear (ITE) hearing devices can be placed deep in the ear canal. Invisible-In-The-Canal (IIC) hearing devices are located fully in and fit inside the ear.

In order to achieve a comfortable fit, an insert member (dome or tip) may be custom-made to the individual ear canal after taking a mould. Moreover, it is important to place the hearing device in the correct position in the ear canal in a way, in which the retention is good. It is also very important that the acoustic sealing is well defined, i.e. that the ventilation of the residual volume in front of the eardrum and behind the hearing instrument is well defined.

Optimum sealing properties (to the ear canal) may be accomplished by providing a custom-made insert member based on an ear canal impression/mould. Alternatively, it is possible to apply an instant approach in which silicone or foam is used for the sealing and where the size of the insert member (e.g. a silicon dome or a foam dome) is selected from a number of prefabricated fixed sizes.

Furthermore, comfortable insertion and safe fixation of an acoustically active part (end portion of a hearing aid tube through which the sound exits) of a bony seal hearing aid is crucial for customer acceptance. Prior art bony seal hearing aids comprise dome portions made of materials such as memory foam, silicon or alike to keep an acoustically active part in place while sealing the external ear canal. It has been observed that such materials, especially if worn on a long term basis, may cause skin irritations in the external ear canal of a user.

Accordingly, it would be useful to be able to form an insert member in an easier manner, in order to increase the comfort of the hearing device user and avoid making traditional ear canal impressions which are thrown away after usage. It may also be useful to provide a means which allows comfortable insertion and safe fixation of an acoustically active part of a hearing aid that is configured to be positioned in the bony part of the ear canal.

SUMMARY

Preferred embodiments of the present disclosure can be achieved by an insert member as defined in claim 1, a hearing device as defined in claim 10, a system as defined in claim 11 and a method as defined in claim 13. Other preferred embodiments are defined in the dependent sub claims, explained in the following description and illustrated in the accompanying drawings.

According to an aspect of the disclosure, the insert member is an insert member for a hearing device, which insert member is a flexible sealing part configured to be inserted into the ear canal of a hearing device user, wherein the insert member comprises at least one through-going hole permeable for sound generated by the hearing device and being transmitted through the insert member to an eardrum of the hearing device user or the at least one through-going hole being configured to allow an acoustically active part of the hearing device to be releasably fastened thereto, wherein the insert member comprises a bag structure containing a non-hardened shapeable material and wherein an opening for receiving a hardening member is provided in the bag structure, wherein the non-hardened shapeable material is configured to be hardened by means of a temperature increment and/or electromagnetic radiation, such as ultraviolet (UV) radiation or a chemical reaction, preferably being initiated by means of the hardening member.

Hereby, it is possible to make an insert member in an easier and faster manner. Moreover, no ear canal impressions have to be made and thrown away after usage.

The insert member is a flexible sealing part configured to be inserted into the ear canal of a hearing device user. The insert member may be a dome or a tip adapted to acoustically seal against the ear canal wall.

The insert member comprises at least one through-going hole permeable for sound generated by the hearing device and being transmitted through the insert member to an eardrum of the hearing device user or the at least one through-going hole being configured to allow an acoustically active part of the hearing device to be releasably fastened thereto.

Hereby, the sound generated by the hearing device can be transmitted to an eardrum of the hearing device user.

The insert member comprises a bag structure containing a non-hardened shapeable material. The non-hardened shapeable material may be a composition (e.g. a gel or a liquid and powder containing composition, such as an acrylic fluid) that requires light (e.g. UV radiation) to cure or harden. The non-hardened shapeable material may comprise a light-activated resin, a gel or a material which is rubber-like (i.e. mechanically softer) when it is hardened.

The bag is configured to keep the non-hardened shapeable material in place until the non-hardened shapeable material is hardened. The bag prevents skin contact with the non-hardened shapeable material.

Since the resin remains liquid until exposed to light (with a specific wave length), it is possible to shape the resin to achieve a specific geometry of the insert member.

An opening for receiving a hardening member is provided in the bag structure. Hereby, the hardening member can be inserted into a desirable position in the bag structure so that the hardening member can initiate a hardening or curing process.

The non-hardened shapeable material may be hardened by means of a temperature increment and/or electromagnetic radiation, such as UV radiation or a chemical reaction, preferably being initiated by means of the hardening member.

Any suitable hardening process that can be initiated by means of the hardening member may be applicable. The hardening member may be configured to emit UV radiation for hardening the non-hardened shapeable material.

The hardening member may be configured to increase the temperature of the shapeable material and hereby initiate a hardening process.

The hardening member may be configured to introduce a chemical reaction initiating the hardening process.

The hardening member may be configured to initiate a mixing of two components comprised in the bag structure in such a manner that the mixing initiates the hardening process. The hardening member may be configured to cause a separation wall, separating two or more compartments in the bag, to break so that chemical will start to mix.

According to another aspect of the disclosure, the bag structure comprises a wall member configured to provide a predefined geometry of at least a portion of the bag structure.

Hereby, the wall member can secure that a well-defined structure is provided in at least a portion of the bag structure. The wall member may be adapted to define a predefined opening structure allowing for insertion of a hardening member having a known geometry.

The wall member may define a cavity or a ventilation structure for allowing ventilation of the hardened insert member.

According to yet another aspect of the disclosure, the wall member is configured to provide a predefined geometry of a through-going hole.

Hereby, in one embodiment, it is possible to achieve a predefined through-going hole for transmission of sound to an eardrum of the hearing device user. In another embodiment, it is possible to achieve a predefined through-going hole for allowing an acoustically active part of the hearing device such as a receiver to be releasable fastened to the through-going hole.

According to a further aspect of the disclosure, the wall member is configured to maintain its geometry upon being exposed to a temperature increment and/or electromagnetic radiation, such as UV radiation or a chemical reaction, preferably being initiated by means of the hardening member. In other words, the geometry of the wall member is predefined such that the wall member is configured to prevent alteration in its geometry when the wall member is exposed to a temperature increment and/or electromagnetic radiation, such as UV radiation or a chemical reaction Hereby, it is possible to make an insert member having a geometry that fits the hardening member. It is further possible to achieve additional fixed structures if desired. Such structure may by way of example be a through-going hole having a specific geometry, a ventilation structure or a cavity having a predefined geometry.

According to another aspect of the disclosure, the wall member is provided with at least one through-going canal.

Hereby, a well-defined through-going canal can be achieved in the insert member.

According to yet another aspect of the disclosure, the insert member comprises a reservoir permanently or releasably connected to the bag structure.

Hereby, it is possible to provide the bag structure with additional non-hardened shapeable material during the forming process. This is in particular an advantage if the volume of the bag structure is increased during the forming process.

According to a further aspect of the disclosure, the insert member comprises a reservoir permanently or releasably connected to the bag structure via a tube or hose structure.

Hereby, it may be possible to arrange the reservoir in a larger range of positions. For example, in an embodiment, the reservoir is positioned within the ear canal, typically in a close proximity to the bag structure. Alternatively, in another embodiment, the reservoir may be positioned outside the ear canal and may thus be used to supply the bag structure with additional non-hardened shapeable material during the forming process.

In yet another embodiment, the insert member comprising the bag structure contains a predefined volume of the non-hardened shapeable material. In this implementation, the bag structure does not include a connection to the reservoir having additional supply of the non-hardened shapeable material. The predefined volume of the non-hardened shapeable material is defined as an amount that is enough to provide a seal between the insert member and surface of the bony portion of the ear canal. This is achieved by subjecting the predefined volume of the non-hardened shapeable material to the forming/curing process, thereby resulting in hardening of the non-hardened shapeable material such that the hardened material is adapted to the anatomical shape of the bony part of the ear canal.

According to yet another aspect of the disclosure, the bag structure is made in a material capable of preventing the non-hardened shapeable material from penetrating out of the bag structure. In an embodiment, such material may include non-porous material. A few example of such non-porous materials include silicone or polyurethane. In another embodiment, such material may include porous materials made from fabricated polymers which are woven, knitted, felted, or veloured, or materials which are foamed, stretched, or expanded may also be used. The pore size of these materials should be less than the smallest particle size of the non-hardened shapeable material in order to avoid loss of the non-hardened shapeable material from the bag structure. Permeable membranes such as thin cellulosic or silicone may also be used. Additionally, these non-porous material may be biocompatible. The bag structure may include a smooth or textured surface.

In an embodiment, the material for the bag structure may include a hydrophobic coating that is adapted to contact the ear drum surface when the bag structure is in position.

Hereby, the non-hardened shapeable material can be maintained in the bag structure.

According to another aspect of the disclosure, the bag structure is formed to shape and define at least a portion of the distal end portion of the insert member and/or at least a portion of the proximal end portion of the insert member.

Hereby, it is possible to achieve a predefined structure of the distal end portion and/or the proximal end portion of the insert member. The length of the insert member may be controlled in this manner.

According to a further aspect of the disclosure, the insert member is adapted to be arranged in and seal a bony portion of the user's ear canal when the non-hardened shapeable material has hardened.

Hereby, the insert member will have the desired sealing when the non-hardened shapeable material has hardened. The insert member can be applied as a dome or a tip as alternative to traditional domes or tips.

According to another aspect of the disclosure, the insert member is adapted to be arranged in a bony portion of the user's ear canal. The insert member's structure is adapted to have the structure that compliments and locks bony portions' structure of the bony portion of the ear canal or the ear canal of the hearing device user when the non-hardened shapeable material has hardened, thus providing desired sealing. For example, the insert member's diameter is adapted to have the same diameter as the bony portions' diameter of the ear canal of the hearing device user when the non-hardened shapeable material has hardened.

Accordingly, the insert member will have the same structure/diameter as the bony portions of the ear canal so that optimal sealing conditions can be achieved.

The hearing device according to the disclosure is a hearing device comprising an insert member according to the disclosure.

The system according to the disclosure is a system comprising an insert member according to the disclosure and a hardening member configured to harden (or initiate the hardening process of) the non-hardened shapeable material by means of a temperature increment and/or electromagnetic radiation, such as UV radiation or a chemical reaction, directly or indirectly initiated by means of the hardening member.

By having such a system, it is possible to initiate the hardening process in a controlled manner.

According to an even further aspect of the system according to the disclosure, the hardening member is adapted to allow for inspection through it. At least a portion of the hardening member may be transparent to allow for visual inspection of the insert member during insertion of the hardening member by way of example. This will allow the user to "see" through the hardening member.

According to a further aspect of the disclosure, the hardening member comprises an activation member.

Hereby, the activation member can be applied to control when to initiate the hardening process.

The activation member may be arranged in a position, in which it is accessible from outside the ear canal. The activation member may be a button, e.g. a push button.

According to another aspect of the disclosure, the hardening member comprises a flexible member connecting a first structure and a second structure of the hardening member, wherein the second structure is accessible from outside the ear canal.

The flexible member can allow the first structure and a second structure of the hardening member to be angled relative to each other. Hereby, the insertion of the hardening member into engagement with the opening for receiving the hardening member in the bag structure is eased. The flexible structure may comprise several connection members connected by joints.

The method according to the disclosure is a method for manufacturing an insert member for a hearing device, which insert member is a flexible sealing part configured to be inserted into the ear canal of a hearing device user, wherein the insert member comprises at least one through-going hole permeable for sound generated by the hearing device transmitted through the insert member to an eardrum of the hearing device user or the at least one through-going hole being configured to allow an acoustically active part of the hearing device to be releasably fastened thereto, wherein the method comprises the steps of:

- inserting a bag structure containing a non-hardened shapeable material into the ear canal of a hearing device user, wherein the non-hardened shapeable material is configured to be hardened by means of a temperature increment and/or electromagnetic radiation, such as UV radiation or a chemical reaction, preferably being initiated by means of the hardening member;
- inserting a hardening member into an opening in the bag structure;
- hardening the non-hardened shapeable material by means of a temperature increment and/or electromagnetic radiation, such as UV radiation provided by using the hardening member or a chemical reaction, preferably being initiated by means of the hardening member;
- Removing the hardening member from the ear canal.

The method makes it possible to form an insert member in an easier manner thereby avoiding making ear canal impressions that are thrown away after usage.

According to an aspect of the disclosure, the method comprises the stem of applying a bag structure that comprises a wall member (or wall members) configured to provide a predefined geometry of at least a portion of the bag structure.

Hereby, it is possible to control the geometry of the insert member by means of the wall member (or wall members).

According to a further aspect of the method according to the disclosure, the method wall member is applied to provide a predefined geometry of a through-going hole in the insert member.

Hereby, a well-defined geometry of the through-going hole can be achieved. Moreover, the position of the through-going hole can be controlled by means of the wall member.

According to an even further aspect of the method according to the disclosure, the insert member is attached to a speaker unit (receiver).

Hereby, the insert member may be applied as a dome or tip together with several types of hearing devices, including BTE, RITE, ICC and ITE type hearing devices.

BRIEF DESCRIPTION OF THE DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effects will be apparent from and elucidated with reference to the illustrations described hereinafter in which:

DETAILED DESCRIPTION

Figure 1A:
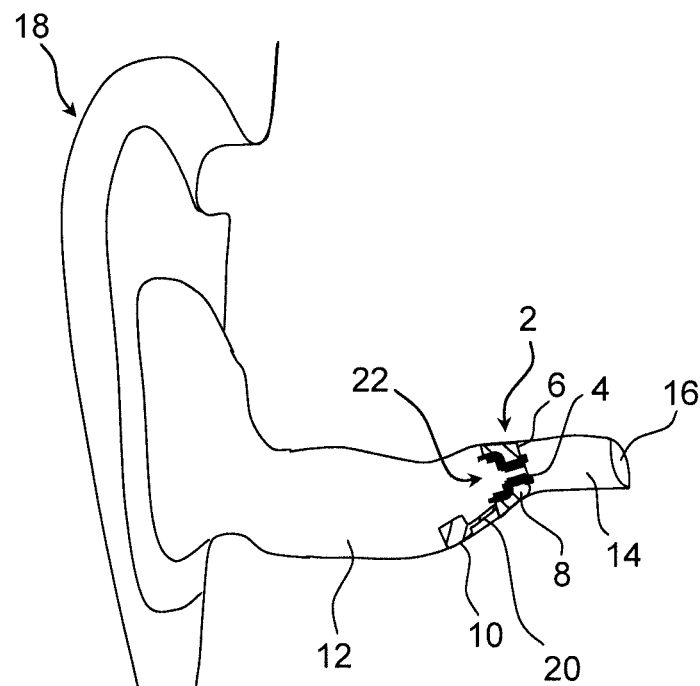
FIG. 1A shows a schematic view of an insert member according to an embodiment of the disclosure.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus are described by various blocks, functional units, modules, components, steps, processes etc. (collectively referred to as "elements"). Depending on the particular application, design constraints or other reasons, these elements may be implemented using electronic hardware, computer programs, or any combination thereof.

A hearing device may include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device adapted to receive an audio signal electronically, possibly modifying the audio signal and providing the possibly modified audio signals as an audible signal to at least one of the user's ears. Such audible signals may be provided in the form of an acoustic signal radiated into the user's outer ear.

The hearing device is adapted to be worn in any known way. This may include i) arranging a unit of the hearing device behind the ear with a tube leading air-borne acoustic signals into the ear canal or with a receiver/loudspeaker arranged close to or in the ear canal such as in a Behind-the-Ear type hearing aid, and/or ii) arranging the hearing device entirely or partly in the pinna and/or in the ear canal of the user such as in an In-the-Ear type hearing aid or In-the-Canal/Completely-in-Canal type hearing aid.

The insert member according to the disclosure may be applied in a "hearing system" referring to a system comprising one or two hearing devices. The hearing system may include one or more auxiliary device(s) that communicate with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of the following: remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, or a PC. The audio gateway is further adapted to select and/or combine an appropriate signal out of the received audio signals (or combination of signals) for transmission to the at least one hearing device. The remote control is adapted to control functionality and operation of the at least one hearing devices. The function of the remote control may be implemented in a Smartphone or another electronic device, the Smartphone/electronic device possibly running an application that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such a directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously.

Figure 1B:
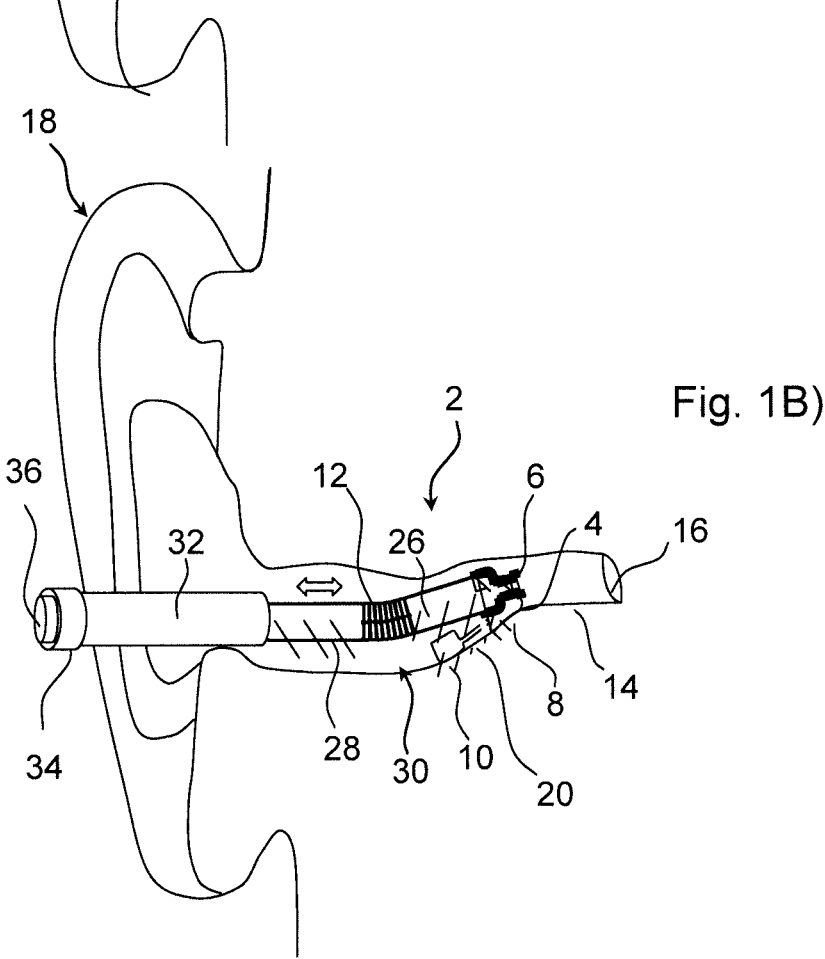
FIG. 1B shows a schematic view of a system according to an embodiment of the disclosure.

Referring now in detail to the drawings for the purpose of illustrating preferred embodiments of the disclosure, FIG. 1A illustrates a schematic view of an ear 18 and an insert member 2 according to an embodiment of the disclosure, and FIG. 1B illustrates a schematic view of an ear 18 and a system comprising the insert member 2 shown in FIG. 1A and a hardening member formed as a light pen 26 capable of emitting UV radiation in order to harden the non-hardened shapeable material 8 in the bag structure 6 of the insert member 2.

The insert member 2 has been arranged in the bony region of the ear canal 12 in front of the eardrum 16 of a hearing device user. The insert member 2 may be positioned by means of a hardening member 26. Centrally arranged opening 22 is provided in the insert member 2. The opening 22 fits the distal end of the hardening member 26. In FIG. 1B, the distal end of the hardening member 26 has been inserted into the opening 22 of the insert member 2.

In an embodiment, a reservoir 10 with non-hardened shapeable material 8 is permanently or releasably connected to the bag structure 6 of the insert member 2 by means of a tube 20. The reservoir 10 may be configured to supply additional non-hardened material, if required, during the forming process. The connection point of the tube 20 and the bag structure 6 may include a closure mechanism such as hardening of the non-hardened shapeable material at the connection point or plug stopper like a bung.

The insert member 2 may comprise a reservoir 10 permanently or releasably connected to the bag structure 6. Accordingly, the bag structure 6 can be supplied with additional non-hardened shapeable material during the forming process. This may be an advantage if the volume of the bag structure 6 increases during the forming process.

The insert member 2 comprises a wall member 4 extending in the distal end of the bag structure 6. Accordingly, by applying a wall member 4 that maintains its geometry during the hardening process, the wall member 4 is capable of defining the structure of the distal end of the bag structure 6. Likewise, the wall member 4 is capable of defining a through-going hole permeable for sound generated by a hearing device (not shown) and being transmitted through the insert member 2 via the space 14 (between the insert member 2 and the eardrum 16) to the eardrum 16 of the hearing device user. The through-going hole may also be configured to allow an acoustically active part of the hearing device to be releasably fastened thereto, thus allowing sound to be transmitted via the space 14 to the eardrum 16 of the hearing device user.

In FIG. 1B, the distal end of the hardening member 26 formed as a light pen has been inserted into the opening 22 of the insert member 2. A flexible member 30 is attached to the proximal end of the light pen 26 and to a connection rod 28 that is further connected to an activation rod 32 accessible from outside the ear canal 12. An activation button 36 is provided in the end portion 34 of the activation rod 32. By pressing the activation button 36, the distal end of the light pen 26 will start emitting UV radiation. This will initiate the hardening process of the non-hardened shapeable material in the bag structure 6. By applying a bag structure 6 having a flexible outer structure, it is possible to shape the flexible outer structure of the bag structure 6 in order to achieve an insert member 2 that fits the geometry of the ear canal 12.

The activation rod 32 may be equipped with a timer unit (not shown), such as an electronic timer for controlling the duration of the UV radiation period.

Figure 2:
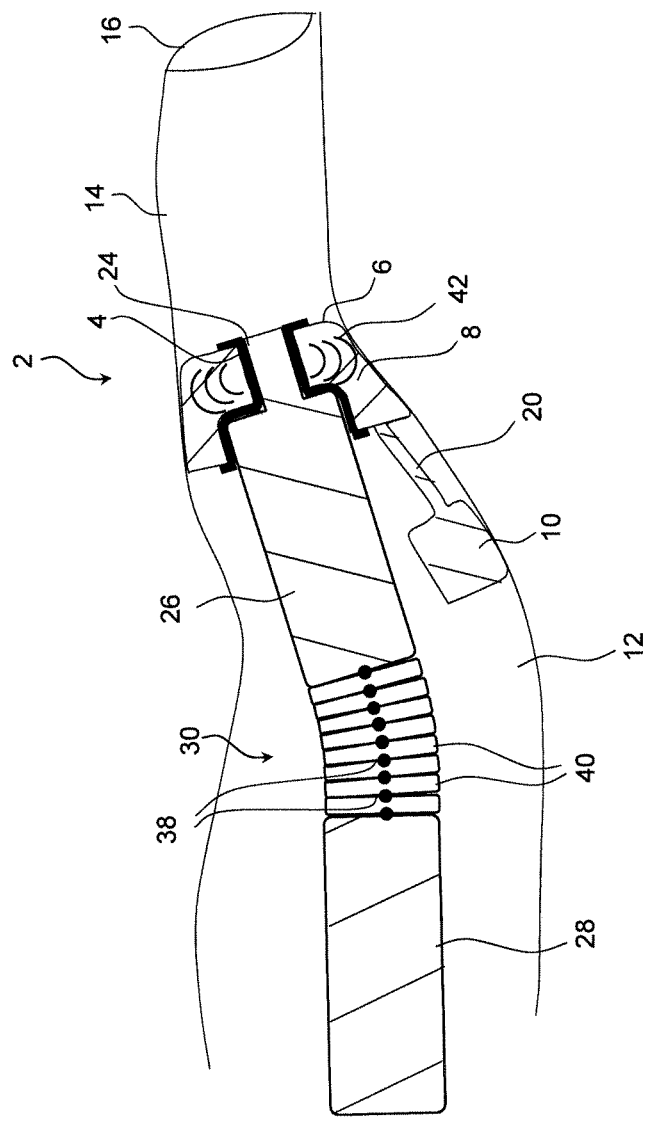
FIG. 2 shows a close-up view of the system shown in FIG. 1B.

FIG. 2 illustrates a close-up view of the system shown in FIG. 1B.

The distal end 24 of the light pen 26 is inserted into the opening of the insert member 2. The bag structure 6 has adapted the shape of the part of the ear canal 12 that the bag structure 6 abuts. A space 14 is defined between the insert member 2 and the eardrum 16.

The light pen 26 is activated and emits UV light 42 towards the outer periphery of the insert member 2. The UV light 42 initiates the hardening process of the non-hardened shapeable material 8 in the bag structure 6. A flexible member 30 connects the proximal end of the light pen 26 and a connection rod 28.

The flexible member 30 makes it possible to angle the connection rod 28 relative to the light pen 26. Hereby, the insertion of the distal end 24 of the light pen 26 into engagement with the opening for receiving the light pen 26 in the bag structure 6 is eased. The flexible structure 30 comprises a plurality of disk-shaped connection members 40 each being connected by joints 38. Each pair of adjacent connection members 40 can be rotated and/or flexed relative to each other. Hereby, the flexible member 30 provides a flexible coupling between the connection rod 28 and the light pen 26.

When the insert member 2 is hardened, it may be removed from the ear canal 12 by means of the light pen 26. The light pen 26 may comprise a retention member configured to fix the light pen 26 to the insert member 2 during removal and/or insertion of the insert member 2.

In an embodiment, the light pen 26 may comprise a compression unit (not shown) configured to compress the reservoir 10 in order to supply the bag structure 6 with an additional quantity of the non-hardened shapeable material 8. Such compression unit may be controllable by means of an activation unit (e.g. a button) accessible from outside the ear canal 12.

Figure 3A:
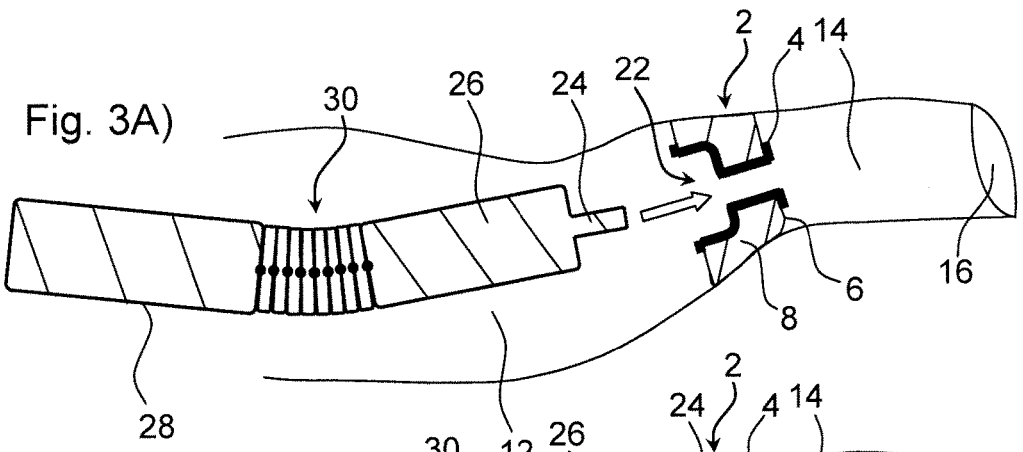
FIG. 3A shows a schematic view of a hardening member being inserted into an opening in the insert member.
Figure 3B:
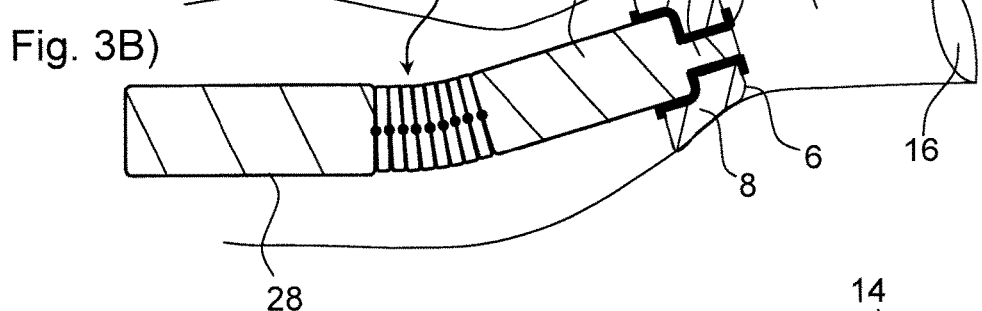
FIG. 3B shows a schematic view of the hardening member inserted into the opening in the insert member shown in FIG. 3A.
Figure 3C:
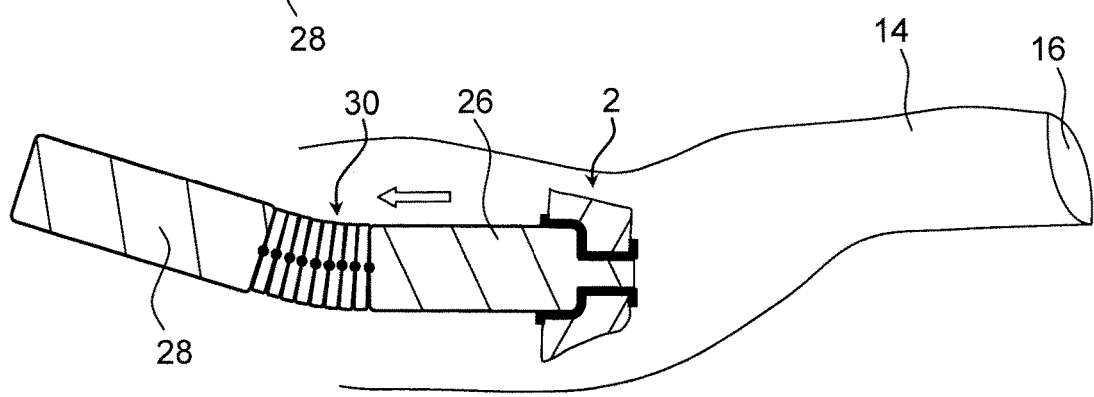
FIG. 3C shows a schematic view of the hardening member being used to remove the insert member shown in FIG. 3B.
Figure 3D:
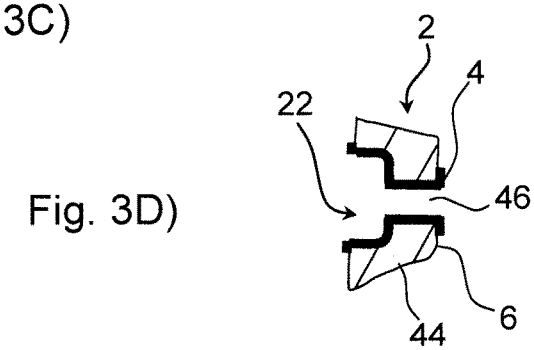
FIG. 3D shows a schematic view of the hardened insert member shown in FIG. 3B.

FIG. 3A illustrates a schematic cross-sectional view of a hardening member being inserted into an opening in the insert member 2 according to the disclosure. FIG. 3B illustrates a schematic cross-sectional view of the hardening member inserted into the opening 22 in the insert member 2 shown in FIG. 3A. FIG. 3C illustrates a schematic cross-sectional view of the hardening member being used to remove the insert member 2 shown in FIG. 3B, whereas FIG. 3D illustrates a schematic cross-sectional view of the hardened insert member 2 shown in FIG. 3B.

The hardening member comprises a connection rod 28, a light pen 26 and a flexible member 30 coupling the connection rod 28 and the light pen 26. The distal end 24 is configured to be received by the opening 22 of the insert member 2. The opening 22 is centrally arranged in the insert member 2. The insert member 2 has been arranged in the bony region of the ear canal 12 in front of the eardrum 16 of a hearing device user.

The insert member 2 can be arranged next to the space 14 by means of the hardening member. The opening 22 is configured to receive and fit the distal end 24 of the light pen 26. In FIG. 3B, the distal end of the light pen 26 has been inserted into the opening 22 of the insert member 2.

The insert member 2 comprises a wall member 4 extending along a portion of the proximal portion of the insert member, along the through-going hole in the insert member and along a portion of the distal end of the insert member 2. If choosing a wall member 4 configured to maintain its geometry during the hardening process, the wall member 4 will have the ability to define the structure of the distal end, the proximal end and the through-going hole of the bag structure 6 and thus of the insert member 2.

In FIG. 3D, it can be seen that the hardened insert member 2 has the same shape/geometry as when it was arranged and formed in the ear canal 12 (see FIG. 3B). The hardened material 44 ensures that the insert member 2 maintains its geometry. The insert member 2 is a flexible sealing part configured to be inserted into the ear canal 12 of the ear 18 shown in FIG. 3A, FIG. 3B and FIG. 3C.

The hardened insert member 2 comprises a through-going hole 46 having a geometry defined by the wall member 4.

Figure 4B:
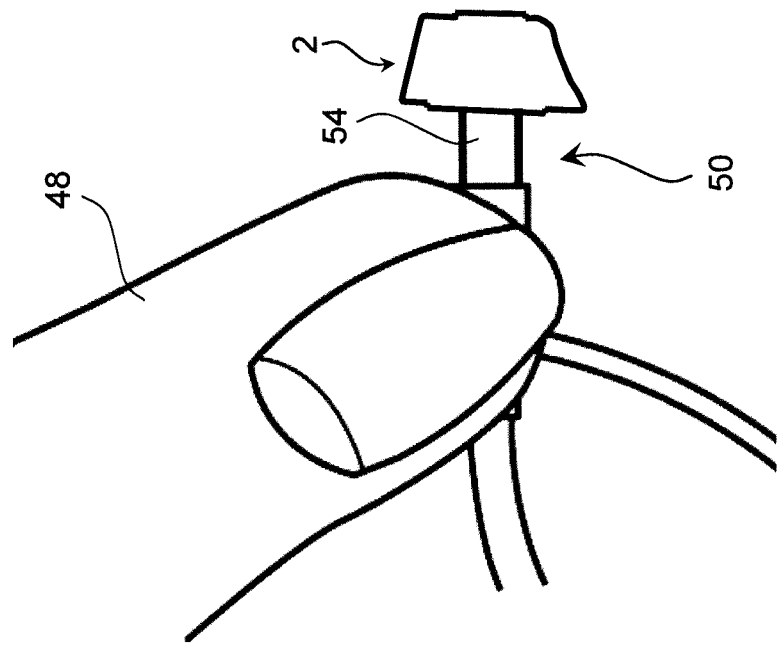
FIG. 4B shows the insert member shown in FIG. 4A mounted on the receiver.
Figure 4A:
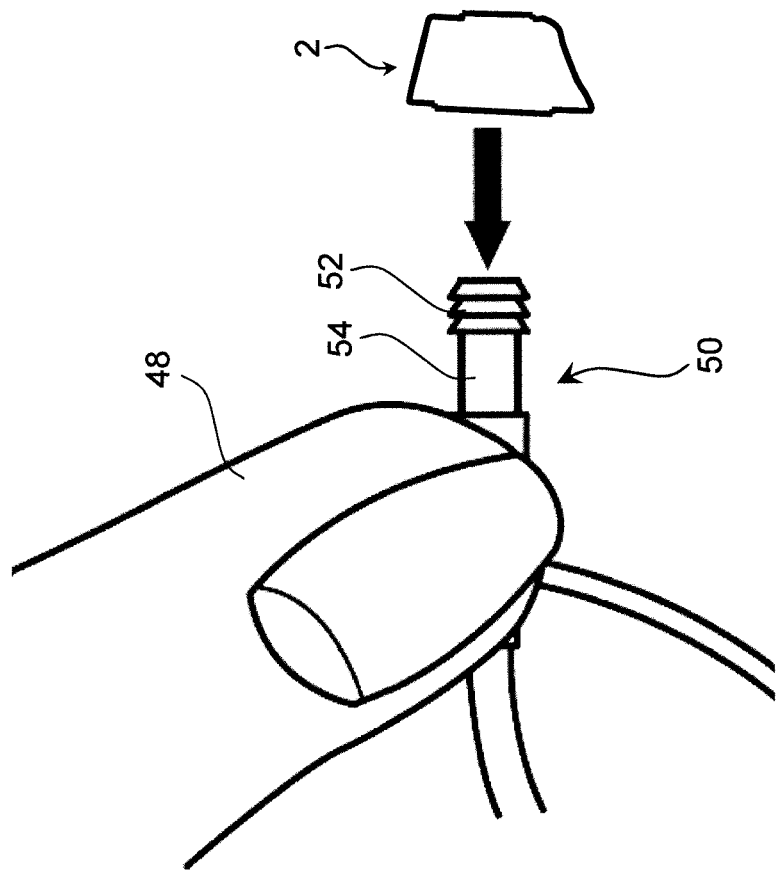
FIG. 4A shows an insert member being attached to a receiver.

FIG. 4A illustrates an insert member 2 being attached to a receiver 50 held by the finger 48 of a hearing device user. The receiver 50 comprises a tube 54 having an attachment structure 52 provided at its distal end. The attachment structure 52 is configured to provide a reliable and firm attachment of the insert member 2 to the receiver 50. The attachment structure may include an insertable male-female type mechanical attachment unit as illustrated in the FIG. 4A. However, other types of attachments are also within the scope of this disclosure. One such other type of attachment is illustrated in relation to FIG. 4C.

FIG. 4B illustrates the insert member 2 shown in FIG. 4A mounted on the receiver 50.

Figure 4C:
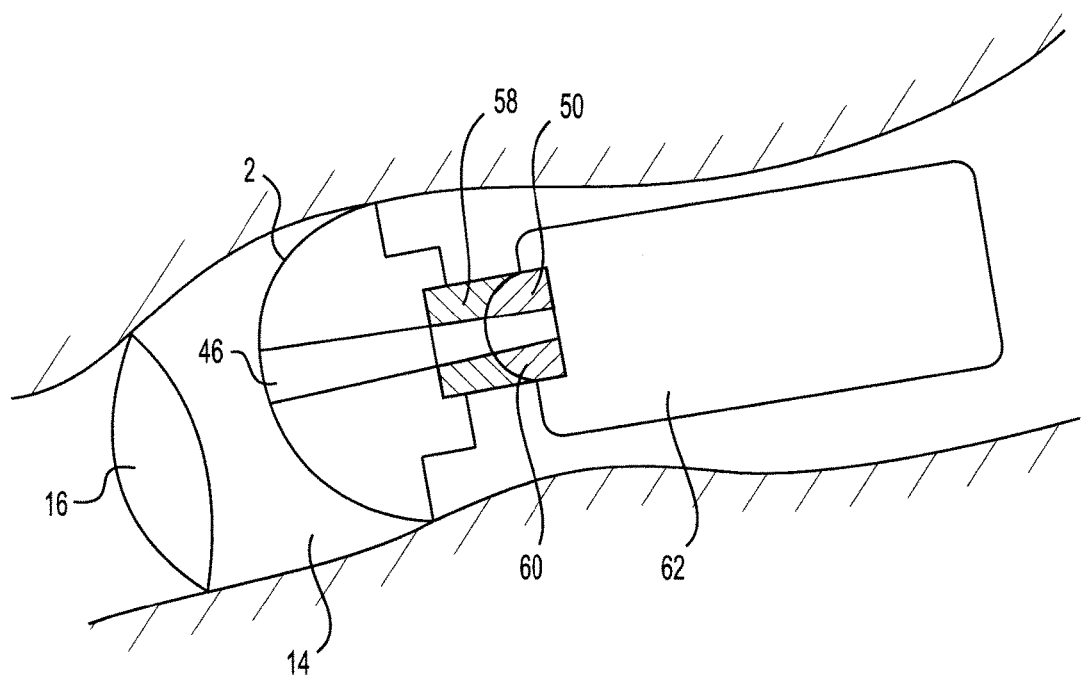
FIG. 4C shows magnetic connectors according to an embodiment of the disclosure.

FIG. 4C illustrates an insert member 2 being attached to a hearing aid 62 according to an embodiment of the disclosure. The insert member 2 includes a first magnetic unit 58 and the receiver 50 or a hearing aid component physically interacting with the insert member 2 includes a second magnetic unit 60. The attraction force between first magnetic unit 58 and the second magnetic unit 60 provides physical attachment between the insert member 2 and the hearing aid 62. This magnetic based attachment allows for easy, quick and secure positioning of the hearing aid 62 in the bony part of the ear canal 12. This is facilitated by having the insert member 2 pre-positioned within the bony part of the ear canal 12 using the disclosed forming/curing process, when the insertion of the hearing aid 62 takes place. It is visible that the sound tube or outlet of the hearing aid is in alignment with the through-going hole 46 of the insert member 2. Similarly, the removal of the hearing aid 62 from the bony part of the ear canal 12 is simplified whereby a pulling force exceeding the magnetic attraction between the first magnetic unit 58 and the second magnetic unit 60 allows for removing the hearing aid only (such as for recharging) and not the insert member from the bony part of the ear canal. In one embodiment, the receiver 50 is attached the insert member 2 and the combined receiver-insert member assembly (as shown in FIG. 4B) is then inserted into the bony portion of the hearing aid user. However, in another embodiment, the receiver is attached to the insert member while the insert member is previously positioned or already available within the bony portion of the ear canal. This may allows for replacing a receiver already positioned in the bony part using the insert member with a replacement receiver while retaining the insert member in the bony portion during the replacement process.

Figure 5:
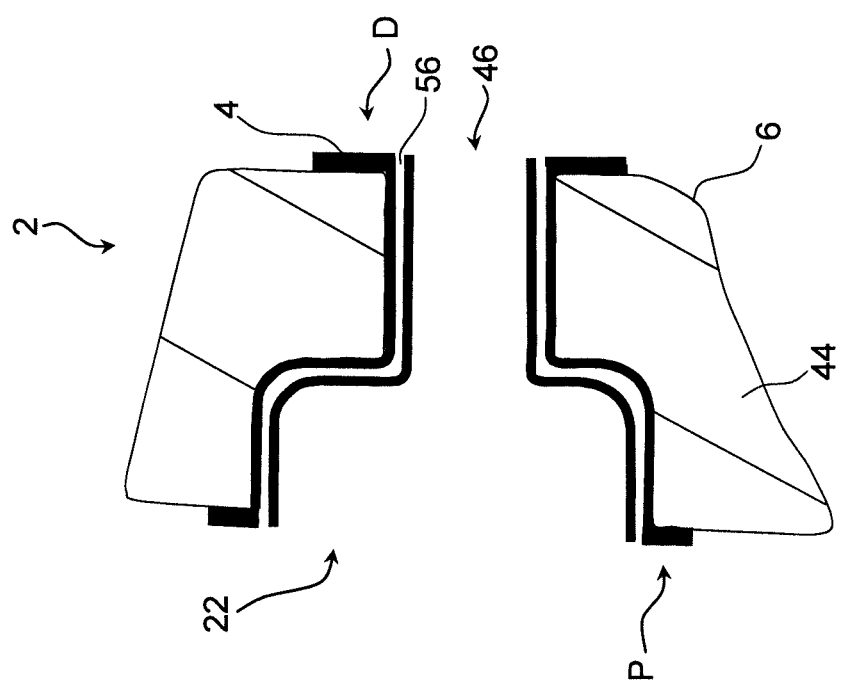
FIG. 5 shows a close-up view of an insert member according to the disclosure.

FIG. 5 illustrates a close-up view of an insert member 2 according to the disclosure. The insert member 2 is formed to fit the bony portion of a hearing device user's ear canal.

The insert member 2 comprises a bag structure 6 filled with hardened material 44. A wall member 4 extends through the insert member 2 and defines a through-going hole 46. The wall member 4 extends along a portion of the distal end D of the insert member 2 and along a portion of the proximal end P of the insert member 2. It can be seen that the opening 22 provided in the proximal portion of the insert member 2 is wider than the through-going hole 46 extending in the distal portion of the insert member 2.

A ventilation canal 56 is provided in the wall member 4 in order to allow for pressure equalization and hereby reduction or elimination of the occlusion effect build-up of sound pressure in the ear canal.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

LIST OF REFERENCE NUMERALS

2 Insert member (dome, tip or earmould)
4 Wall member
6 Bag structure
8 Shapeable material
10 Reservoir
12 Ear canal
14 Space
16 Eardrum
18 Ear
20 Tube
22 Opening
24 Distal end
26 Light pen
28 Connection rod
30 Flexible member
32 Activation rod
34 End portion
36 Activation button
38 Joint
40 Connection member
42 Light
44 Hardened material
46 Hole
48 Finger
50 Receiver
52 Attachment structure
54 Tube
56 Canal
D Distal
P Proximal

The invention claimed is:

1. An insert member for a hearing device, said insert member comprising:
  a through-going hole, said through-going hole being configured for transmitting sound generated by the hearing device to an eardrum of a hearing device user or being configured to allow an acoustically active part of the hearing device to be releasably fastened thereto;
  a bag structure containing a non-hardened shapeable material, said bag structure having an opening for receiving a hardening member, wherein the non-hardened shapeable material is configured to be hardened by the hardening member;
  a wall member, said wall member being configured to: provide a predefined geometry of at least a portion of said bag structure, provide a predefined geometry of said through-going hole, and define the opening of said bag structure for receiving the hardening member, said wall member further being configured to extend along a portion of at least one of a distal end of said insert member and a proximal end of said insert member,
  wherein said insert member is a flexible sealing part configured to be inserted and pre-positioned into an ear canal of the hearing device user.

2. An insert member according to claim 1, wherein the wall member is configured to maintain its geometry during a hardening of the shapeable material initiated by the hardening member.

3. A hearing device comprising an insert member according to claim 2.

4. An insert member according to claim 1, wherein the wall member is provided with at least one through-going ventilation canal.

5. A hearing device comprising an insert member according to claim 4.

6. An insert member according to claim 1, wherein the insert member comprises a reservoir permanently or releasably connected to the bag structure.

7. A hearing device comprising an insert member according to claim 6.

8. An insert member according to claim 1, wherein the bag structure is made in a material capable of preventing the non-hardened shapeable material from penetrating the bag structure.

9. An insert member according to claim 1, wherein the bag structure is formed to shape and define at least a portion of the distal end portion of the insert member and at least a portion of the proximal end portion of the insert member.

10. An insert member according to claim 1, wherein the insert member is adapted to be arranged in and seal a bony portion of the ear canal of the hearing device user when the non-hardened shapeable material has hardened.

11. A hearing device comprising an insert member according to claim 1.

12. A system comprising an insert member according to claim 1 and a hardening member configured to harden the non-hardened shapeable material.

13. A system according to claim 12, wherein the hardening member comprises a flexible member connecting a first structure and a second structure of the hardening member, wherein the second structure is accessible from outside the ear canal.

14. A system according to claim 12, wherein the shapeable material is hardened by ultraviolet (UV) radiation and the hardening member is a UV light pen.

15. An insert member according to claim 1, wherein the shapeable material is hardened by temperature increment and/or electromagnetic radiation.

16. An insert member according to claim 15, wherein the shapeable material is hardened by ultraviolet (UV) radiation and the hardening member is a UV light pen.

17. An insert member according to claim 1, further comprising a magnetic unit for detachably coupling said insert member to a hearing aid unit.

18. A method for manufacturing an insert member for a hearing device, which insert member is a flexible sealing part configured to be inserted and pre-positioned into an ear canal of a hearing device user, wherein the insert member comprises a through-going hole configured for transmitting sound generated by the hearing device to an eardrum of the hearing device user or configured to allow an acoustically active part of the hearing device to be releasably fastened thereto, the insert member further comprising a bag structure containing a non-hardened shapeable material and having an opening for receiving a hardening member, and a wall member, the wall member being configured to: provide a predefined geometry of at least a portion of the bag structure, provide a predefined geometry of the through-going hole, and define an opening of the bag structure for receiving the hardening member, the wall member further being configured to extend along a portion of at least one of a distal end of the insert member and a proximal end of the insert member, wherein the method comprises the steps of:
  inserting the bag structure containing the non-hardened shapeable material into the ear canal of the hearing device user, wherein the non-hardened shapeable material is configured to be hardened by the hardening member;
  inserting the hardening member into the opening in the bag structure defined by the wall member;
  hardening the non-hardened shapeable material by means of the hardening member; and
  removing the hardening member from the opening in the bag structure and from the ear canal of the hearing device user.

19. A method according to claim 18, wherein the shapeable material is hardened by temperature increment and/or electromagnetic radiation.

20. A method according to claim 19, wherein the shapeable material is hardened by ultraviolet (UV) radiation and the hardening member is a UV light pen.

* * * * *